Dec. 17, 1968    T. H. BENZINGER    3,416,973

QUICK DISCONNECT FOR THERMOCOUPLES

Filed Sept. 27, 1965

*INVENTOR.*
TheodorH.Benzinger
BY
*Attorney*

United States Patent Office 3,416,973
Patented Dec. 17, 1968

3,416,973
QUICK DISCONNECT FOR THERMOCOUPLES
Theodor H. Benzinger, 8730 Preston Place,
Chevy Chase, Md. 20015
Filed Sept. 27, 1965, Ser. No. 490,748
10 Claims. (Cl. 136—235)

ABSTRACT OF THE DISCLOSURE

This invention discloses an electrical connector which may be advantageously utilized with a disposable clinical ear thermometer of the type having as its temperature sensitive element a thermocouple. The male element of this connector is a deformable strip of dielectric material, and the ends of the thermocouple wires are secured to opposite sides of this strip in a parallel, offset manner. Thus, the terminal portions of the thermocouple serve as the contact elements of the male connector. The female connector has a pair of hinged jaws of insulating material, and its contacts are strips of bared conductors which extend completely across each jaw. When the male member is inserted in the female member, each pair of contacts has a right-angle relationship and, consequently, the position of the male member within the female member is not critical.

---

The invention described herein may be manufactured and used by or for the Government of the United States of America for governmental purposes without the payment of any royalties thereon or therefor.

The present invention relates generally to electric switching apparatus and, more particularly, to connectors for use in electrical circuits where pairs of conductors are encountered.

In temperature measuring systems having thermocouple or thermopile sensing elements, some sort of electrical connector usually must be employed in the circuit to interconnect these detectors to their voltage indicating instruments. A wide variety of devices and materials have heretofore been used to make or break the paired thermocouple wires to accomplish this connection. Typical of these are clamps, plugs, screw posts and soldering materials.

If the connectors are made of materials having foreign thermoelectric characteristics and different parts of these connectors are at different temperatures, parasitic thermal potentials develop in the system and degrade the precision of the temperature measuring operation. Besides this source of error, galvanic potentials may occur if the connecting mechanism is a soldered joint made with a soldering flux having acid or alkali properties.

In applicant's U.S. Patent 3,156,117 of Nov. 10, 1964, there is disclosed a clinical ear thermometer which measures the cranial internal temperature at a site as close as feasible to the hypothalamus, the human thermostat. This ear thermometer, which is essentially a thermojunction precisely formed at the bend of a closed loop, is held in place against the tympanic membrane by an attachment which cooperates with the external auditory canal. To provide a visual indication of the temperature, a suitable voltage measuring instrument is connected to the thermocouple. Because of its simplicity of design, the probe portion of the apparatus may be mass produced and, consequently, it can be discarded after each use. However, as part of the disposable unit, the probe must be attached to one-half of an electrical connector so that the thermocouple can be quickly and conveniently wired to the recording voltmeter.

The connector used for this purpose, not only must be cheap, safe, expendable and simple to operate but, additionally, it must be of compact and lightweight construction. This last requirement is important and comes about because of the fact that the connector must hang suspended from the ear probe, supported only by the friction between the external auditory canal and the attachment which holds the probe in place. If the connector is not of lightweight design, the thermocouple will be dislodged from the tympanic membrane or, in other cases, from the delicate location or body site that is being sensed.

Connectors of the sort alluded to hereinbefore, by their nature, are not suited to the mode of operation required in applicant's internal temperature measuring system. One reason is that they do not possess the necessary lightweight construction. Another is that their designs are usually unsuited for mass production and, hence, they cannot be economically employed as part of a disposable package. Also, some of them require time consuming, two-step preparatory operations, such as, for example, the opening and closing of separate screwing devices.

It is accordingly a primary object of the present invention to provide apparatus for connecting or disconnecting paired conductors.

Another object of the present invention is to provide a small and lightweight disconnector for electrical circuits which can be quickly operated and cheaply manufactured.

A yet still further object of the present invention is to provide a disposable disconnector for use with thermocouples which does not interpose or otherwise introduce foreign thermoelectrically active metals in the circuit.

A yet still further object of the present invention is to provide a simple, lightweight, male portion of a disconnect which can be cheaply manufactured and used economically with disposable electrical devices and the like.

A yet still further object of the present invention is to provide a quick disconnector for electrical circuits wherein the female member can be manipulated so as to short circuit any recording element wired thereto.

A yet still further but important object of the present invention is to provide an electrical connector where the contact elements are conductors crossing at right angles.

Briefly and in somewhat general terms, the above objects of invention are accomplished in one embodiment by utilizing as the male part of the disconnector a generally rectangular shaped, thin strip of insulating material. On the opposite faces of this strip, a bared terminal portion of one of the thermal conductors is fastened. Each of these conductors extends the complete length of the strip, running parallel to a longitudinal edge thereof. However, one conductor is to the left and the other to the right of the center line of the strip. This offset arrangement of conductors, as will be seen, makes it possible to attain good electrical contact by clamping the insulating strip between two opposing jaws of the female part of the connector. Each of these jaws is a rectangular strip of insulating material, and a T-shaped cable groove is cut in an outer face thereof for accommodating the terminal portion of the connecting thermoelectric conductor with its insulation in place. This conductor passes up the stem of each T, branches off laterally into one side of the crosspiece, passes around the edge of the strip, across the inner face thereof, up around the other edge, back into the other side of the crosspiece and, finally, terminates at an intermediate point along the stem of the T. Hence, each of the jaws of the female element has affixed to its inner surface at a location adjacent one end thereof a horizontal portion of one of the thermoelectric conductors, and this portion extends completely across the face thereof. This segment, which acts as the contact element of the female member, is accordingly stripped of insulation so that the metallic surface of the conductor is exposed.

When the male member is inserted in place between the confronting jaws of the female member, the contacting conductors are therefore at right angles to each other. This crossing relation guarantees a good positive contact between the conductors even if the male member assumes different longitudinal positions within the female member.

The two jaws of the female member may be releasably clamped to the male member in a variety of ways. One simple method merely involves hinging both of the jaws at one end thereof by means of a flexible but unstretchable plastic band. To clamp these jaws together and lock the male in place, a square ring is used. Normally, this ring is supported by the thermocouple conductors at a point adjacent to the connector and, when needed, is moved forward up over the hinged end of the device as far as it can go, thereby forcing the jaws closed against the male element. As an alternative, the flexible hinge can be replaced by a spring device which normally maintains the jaws pressed together and must be momentarily operated to permit the insertion of the male member.

An obvious advantage of the arrangements just described is that a direct wire-to-wire contact under strong pressure is achieved, and this contact is accomplished without the interposition of foreign materials or solders. Also, there is no requirement that the male and female members mate in a precise manner since the crossing relationship of the conductors permits either conductor to be displaced relative to the other without breaking or otherwise imparing the electric continuity between them. It would be pointed out that rather than have a longitudinal conductor on the male member and a horizontal conductor on the female member, this situation may be reversed without affecting the performance of the connector or the advantages derived from the mode of operation mentioned hereinbefore.

Other objects, advantages and novel features of the invention will become apparent from the following detailed description of the invention when considered in conjunction with the accompanying drawings wherein.

Figure 5:
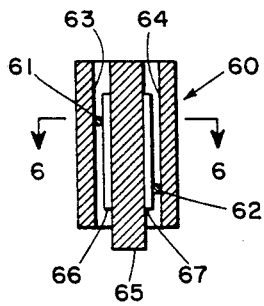
FIG. 5 shows an alternative construction.
Figure 6:
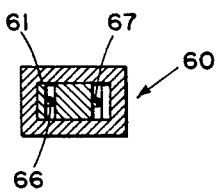

FIG. 6, which is a cross section taken through the apparatus of FIG. 5, illustrates the crossing relationship of the contacts of this connector.

Figure 1:
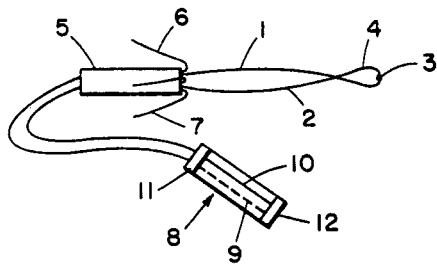
FIG. 1 shows one type of male connector constructed according to one embodiment of the present invention connected to an ear thermometer.

Referring now to FIG. 1 of the drawings which shows one connector of the present invention in combination with applicant's clinical ear thermometer, it will be seen that the disposable probe portion of this instrument consists of a pair of thermoelectrically different conductors 1 and 2, sheathed in plastic tubing and joined together at 3 to form a thermojunction at the bend of a closed loop 4. In order to maintain this thermojunction in contact with the tympanic membrane, a sleeve 5 of relatively stiff material, whose length is much shorter than the length of the auditory canal, is fastened about these conductors. A multiplicity of flexible bristles, such as 6 and 7, are fitted into the annular space between the sheathing covering the thermoelectric conductors and the inner wall of this sleeve. These bristles, where they emerge from the forward end of the sleeve, are bent back at an angle of approximately forty-five degrees with respect to the longitudinal axis of symmetry of the sleeve and, when the probe is inserted into the ear canal, they act to releasably maintain the thermojunction 3 in contact with the tympanic membrane.

As mentioned hereinbefore, this probe preferably should be discarded after each measuring operation. Consequently, an electrical connector must be associated with it to provide a means of attachment to the recording voltmeter. In the present case, the male member 8 of the connector is associated with this probe. This member, which is of simple and lightweight construction, includes a rectangular sheet or strip of insulating material 9. Extending along the complete length of this strip and running parallel to one edge thereof is a bared terminal length 10 of one of the two thermoelectric conductors. This segment of bare conductor, which serves as one of the contacts of the connector, is fastened to strip 9 at a location slightly displaced from the center line of the strip. Any suitable arrangement or technique can be utilized to affix this conductor in place. To this end, it may be glued to the strip along its length, and two narrow crosspieces 11 and 12 of insulating material can overlap it at each end to prevent its dislodgment.

Figure 2:
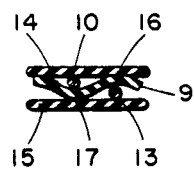
FIG. 2 shows the male member clamped between the opposing jaws of the female member.

A similar bared terminal portion 13 of the other conductor is likewise secured to the opposite face of strip 9, as best shown in FIG. 2. However, in this case, conductor 13 is offset from the center line in a direction opposite to that of conductor 10.

The reason for so displacing the conductors can best be appreciated by examining FIG. 2 which shows the male member 8 gripped and compressed by the clamping action of the opposing jaws 14 and 15 of the female unit. It will be seen that if strip 9 is made of a deformable plastic material, for example, it will bend and assume an undulating shape when the female unit is clamped in place. Consequently, instead of having the contact limited to the two bare conductors, which would be the case if both conductors were in alignment on opposite sides of the strip, this contact is made both along the top surfaces of these conductors and along adjacent parallel lengths 16 and 17 of the strip itself. Thus, the area over which the clamping action occurs when the apparatus is assembled is substantially increased and the holding strength of the connection improved.

Figure 3:
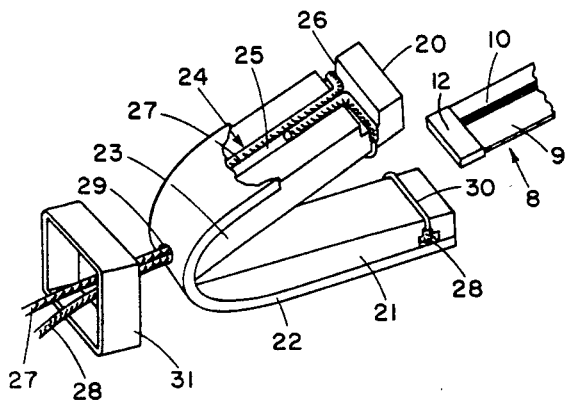
FIG. 3 illustrates one type of female connector.

One type of female unit which may be used in the connector, as shown in exaggerated size in FIG. 3, consists merely of two jaws 20 and 21 of insulating material hinged together at corresponding ends by a flexible but unstretchable plastic band 22. These jaws are of generally rectangular shape with one rear edge portion 23 rounded off for facilitating the attachment of this band. Cut in the outer face of each jaw is a T-shaped cable groove 24 which includes a stem portion 25 and a cross-arm portion 26. The conductors, here 27 and 28, which are to be connected to conductors 1 and 2 of the probe, pass through an aperture 29 cut in the bend of band 22 at a point opposite the bases of the stems of the T-shaped cable grooves. In each case, the conductor with its insulation in place is fitted within the stem of the T and then its terminal portion is effectively wrapped around the end of the jaw by being led into one-half of the cross arms, around the edge, back across the inner face of the jaw, up the other edge, into the other half of the cross arm, and down an intermediate distance into the stem. In this way, each conductor has a horizontal length which extends completely across the inner face of the jaws and, as best revealed on lower jaw 21, this length 30, which acts as the contact member of the female unit, is stripped of insulation so as to have its metallic surface exposed.

In assembling this female unit, it will be appreciated, each conductor is fitted into its cable slot and bonded or otherwise cemented in place. Then, plastic band 22, which may extend over the complete outer surface of the jaws so as to further retain and protect the conductors, is bonded or glued to these jaws.

Square ring 31 is the means used to interlock in a releasable manner the male and female members of the connector. Thus, after male member 8 is introduced into the female unit, this ring is moved forward up over the hinged end as far as it can go, locking strip 9 as a wedge between jaws 20 and 21. To improve the locking action, these jaws may be slightly tapered in thickness with the greatest thickness occurring at their open ends.

Figure 4:
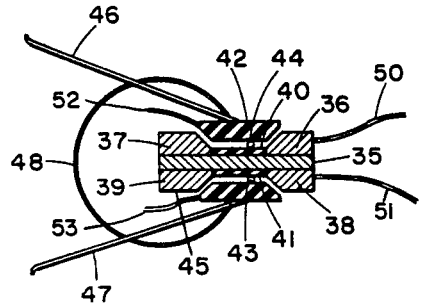
FIG. 4 illustrates a connector which has a spring clamp member.

FIG. 4 illustrates an alternative arrangement wherein the male member is of notched construction. Here, the strip of insulating material 35 again has lengthwise conductors 40 and 41 secured on opposite sides thereof. These conductors are the bared terminal portions of wires 50 and 51, respectively. However, mounted on the edge of this strip are raised rails 36, 37, 38 and 39 which define a pair of vertically aligned slots. The female member of the connector again includes a pair of jaws 42 and 45 which are dimensioned to dovetail into these slots. These jaws are carried by a pair of extension arms 46 and 47 that are maintained under tension by an arcuated band spring 48. Like their counterparts in FIG. 3, jaws 42 and 45 have bared conductors 44 and 43 fastened thereto which extend at right angles to the conductors carried by the male member. These conductors are the bared terminal portions of wires 52 and 53, respectively. Hence, the same crossing relationship of contacts is present in this apparatus.

To disconnect the apparatus of FIG. 4, it is only necessary to squeeze arms 6 and 7 together so as to separate opposing jaws 42 and 45 to the point where they clear the top surface of rails 37 and 39 of the male member.

An obvious advantage of the arrangements described above is that a direct wire-to-wire contact under strong pressure is achieved, and this contact, which cannot be missed because of the crossing relationship of contacts, is accomplished without the interposition of foreign materials or solders.

The male members are extremely cheap to manufacture and lend themselves to mass production. Their size and lightweight construction satisfy the requirements mentioned above in connection with applicant's clinical ear thermometer. Moreover, these connectors are quick, reliable and foolproof. Also, the two wires of the male member emerge on one side of the conductor, while those of the female emerge on an opposite side of the conductor. This characteristic is advantageous since it simplifies identification of the various circuit connections involved.

It will also be recognized that if the jaws of the female member are brought together or allowed to meet, the external circuit coupled thereto will be short-circuited. One of the advantages of this is that it will protect the sensitive recording voltmeter used in applicant's temperature measuring system. Also, as long as the insulating sheet of the male member is not ruptured or otherwise fractured, short circuits are virtually impossible with the connector of the present invention.

Because of the extreme simplicity of the male member of the connector, there is the possibility that the thermoelectric conductors may be reversed when the apparatus is assembled. To safeguard against this, some sort of color coding can be applied to the corresponding male and female elements to show, for example, the two copper contacts or the two constantan contacts.

The concept of employing crossing conductors as the contact members of electrical connectors is not limited to thermo-electric circuits of the type mentioned hereinabove. This arrangement of conductors can be used in any electrical circuit. It can be employed in low voltage as well as high voltage systems.

In FIG. 5 there is shown a connector making use of this concept where the female component, element 60, a closed channel member made of suitable dielectric material, has a pair of vertical conductors 61 and 62 attached to its inner wall surfaces 63 and 64 at spaced locations therealong. Male member 65, which is of wedge-shaped construction, has a pair of horizontal conductors 66 and 67 affixed to opposite wall surfaces thereof. Since these conductors extend over a considerable distance, the relative position of the male and female units of the connector is again not critical. Likewise, since conductors 61 and 62 are staggered, there is little danger of them shorting, and the same is true with regard to conductors 66 and 67 because of their disposition on opposite sides of the male member. FIG. 6, which is a cross section through the connector of FIG. 5 taken along the line shown, best illustrates, perhaps, the right angle relationship between the contacts of the female and male units.

Obviously many modifications and variations of the present invention are possible in the light of the above teachings. It is therefore to be understood that within the scope of the appended claims the invention may be practiced otherwise than as specifically described.

What is claimed is:
1. An electrical connector comprising, in combination:
a female member having a pair of hinged jaws made of insulating material,
a first conductor extending across the inner face of each jaw,
said first conductors contacting each other when said jaws are brought together;
a male member consisting of a strip of insulating material, a second conductor extending down opposite sides of said strip;
said first and second conductors being oriented such that when said strip is inserted between the jaws of said female member said first and second conductors touch each other and cross at right angles to each other.
2. In an arrangement as defined in claim 1 wherein:
each jaw has a T-shaped cable groove cut in each outer face thereof and
said jaws are hinged together at a point adjacent the base of said T-shaped groove by means of a flexible sheet of insulating material which covers said T-shaped cable grooves.
3. In an arrangement as defined in claim 1 wherein:
said second conductors are in spaced parallel relationship to each other and lie in a plane which is not at right angles to said sides of said strip.
4. In an arrangement as defined in claim 1 wherein:
the thickness of said strip is such that when said jaws of said female member are forced toward each other with said strip in between, said strip is deformed and the gripping action takes place between portions of said strip and portions of said jaws.
5. In an arrangement as defined in claim 1 wherein said second conductors are of different thermo-electric material and are interconnected at a point remote from said strip of insulating material to form a thermocouple for sensing a temperature condition.
6. In an arrangement as defined in claim 1 wherein said strip of insulating material is sufficiently thin so that when said strip is inserted between the jaws of said female member and said first and second conductors touch each other, the points at which they touch are at the same temperature and no parasitic thermal potentials are developed.
7. For use as the male element of an electrical conductor which is to be used to make and break the continuity between a first pair of wires and a second pair of wires, the combination of
a deformable, elongated strip of dielectric material;
a first longitudinal conductor secured to one side of said strip,
said conductor being the terminal end portion of one wire of said first pair wires;
a second longitudinal conductor secured to an opposite side of said strip,
said second conductor being the terminal end portion of the other wire of said first pair of wires;
said first and second conductors lying in a plane which is oblique to said sides of said strip whereby when said strip is inserted between a pair of clamping jaws and pressure applied thereacross, said strip is deformed and contact is made over the length of said first and second conductors and along adjacent parallel lengths of said strip.

8. In an arrangement as defined in claim 7 wherein said first and second conductors are of different thermoelectric material and said first pair of wires are interconnected at a point remote from said strip of dielectric material to form a thermocouple for sensing a temperature condition.

9. In arrangement as defined in claim 7 wherein said deformable, elongated strip of dielectric material is sufficiently thin so that the temperature along said first and second conductors is the same, whereby no parasitic thermal potentials are developed when these conductors make contact with other conductors made of similar material in a switching operation.

10. An electrical connector comprising, in combination:

a deformable, flat strip of insulating material;
an elongated conductor attached to opposite sides of said strip;
said conductors being oppositely displaced from the center line of said strip;
a pair of hinged jaws made of insulating material;
a conductor attached to the inner face of each jaw and extending thereacross;
the orientation of the conductors attached to said strip and the orientation of the conductors attached to said jaws being such that when said strip is inserted between said jaws and said jaws clamped together, the confronting conductors touch and cross substantially at right angles whereby the longitudinal position of said strip within said hinged jaws is not critical to the operation of said connector and the elongated conductors attached to said jaws being positioned such that these conductors contact each other when said jaws are brought together.

References Cited

UNITED STATES PATENTS

| | | | |
|---|---|---|---|
| 2,518,464 | 8/1950 | Guillemin | 339—151 X |
| 2,793,355 | 5/1957 | Randall et al. | 339—261 X |
| 2,858,351 | 10/1958 | Taylor | 136—235 X |
| 3,055,961 | 9/1962 | Robertson et al. | 136—235 |
| 3,148,356 | 9/1964 | Hedden | 340—174 |
| 3,156,117 | 11/1964 | Benzinger | 73—359 |

MARVIN A. CHAMPION, *Primary Examiner.*

PATRICK A. CLIFFORD, *Assistant Examiner.*

U.S. Cl. X.R.

339—75